Aug. 30, 1960     E. LEWERTH GEB FRANZ     2,950,840
KITCHEN UTENSIL
Filed March 14, 1958     2 Sheets-Sheet 1
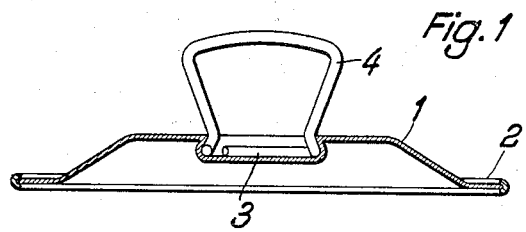
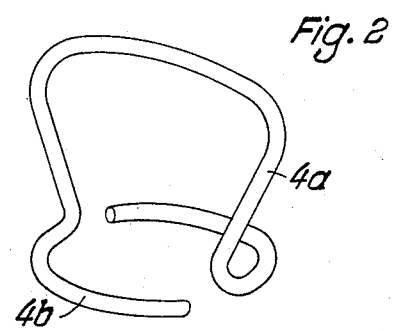
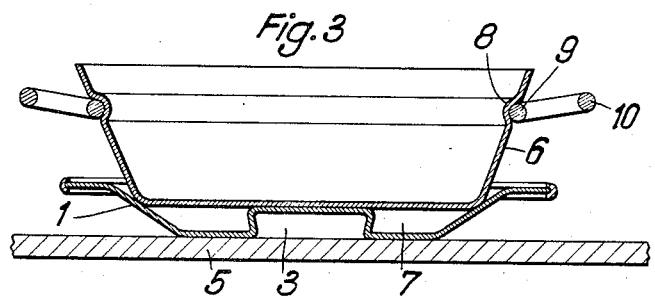
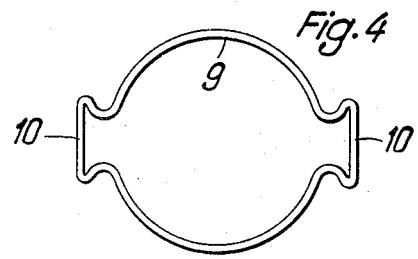
Inventor:
Elizabeth Lewerth neé Franz
by Armand E. Western
Attorney Aug. 30, 1960     E. LEWERTH GEB FRANZ     2,950,840
KITCHEN UTENSIL
Filed March 14, 1958                                                  2 Sheets-Sheet 2
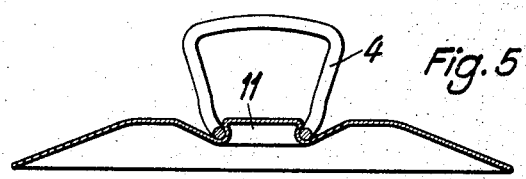
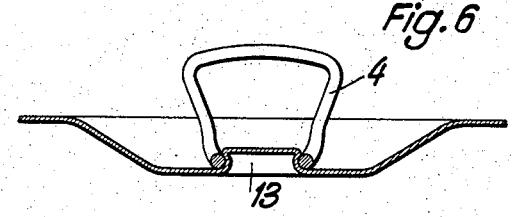
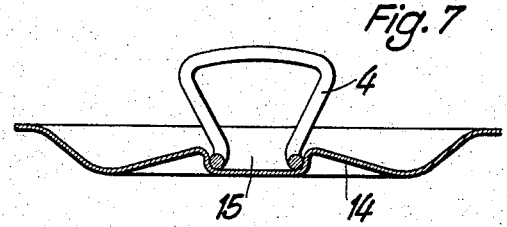
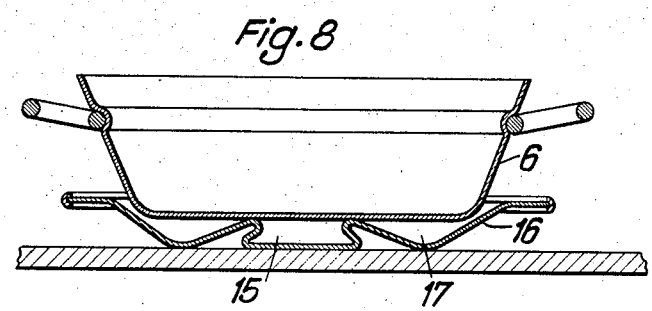
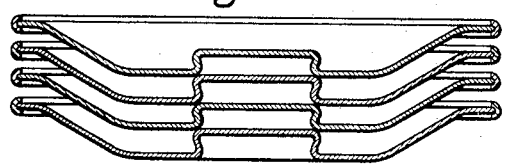
Inventor:
Elisabeth Lewerth neé Franz
by Armand E. Western
Attorney

United States Patent Office 2,950,840
Patented Aug. 30, 1960

2,950,840

KITCHEN UTENSIL

Elisabeth Lewerth, geb. Franz, Seligenstadt (Main), Germany, assignor to Firma Mitteldeutsche Emaillierwerke M. Fratscher & Co., Seligenstadt (Main), Germany Filed Mar. 14, 1958, Ser. No. 721,427

Claims priority, application Germany Apr. 11, 1957

2 Claims. (Cl. 220—95)

The present invention relates to a novel kitchen utensil, the particularity of which consists in the fact that it can be used both for cooking and for serving. The novel kitchen utensil has a lid, is adapted for cooking, frying or baking and is made of metal, preferably enameled iron sheet metal. It is considered as inventive that on the one hand the handle of the lid is removable and that on the other hand the lid is configurated in such a way that it can be used as a serving stand after the handle has been taken off. In order to fulfill the last named property it is necessary that the form of the lid is such that its one side has a sufficient bearing surface to assure its firmness on the surface on which it is placed and that its other side has a configuration which assures the stability of the utensil placed on it. Therefore a recess is preferably provided in the middle of the lid onto which the lid handle is fastened. When the lid is used as a serving stand, it reposes on the outer rim of this recess.

The invention is e.g. embodied in a convex lid with a smooth rim directed downward, which lid is provided in its middle with a laterally bulging recess for inserting a handle holder which may e.g. be elastic. Instead of a laterally bulging recess in the convex lid, the lid may also be provided with a button shaped elevation, arranged in a recess and onto which a handle holder, which may e.g. be elastic, may be pushed. Lids shaped in this manner can be placed with their side down onto the bearing surface, e.g. the dining room table and in this position they have the form of the bowl opening upward into which the utensil to be served can be put.

The inventive idea is e.g. embodied also by a concave lid with a supporting rim bent upward and a button-like elevation in the middle of the curved space for fixing a handle.

A lid configurated in this manner can, contrary to the execution described above, be placed with its under side on the bearing surface, when used as a server. The same applies to a lid with a supporting rim, the middle part of which is slightly convex and in the middle of the curved space of which a laterally bulging recess for the introduction of a handle is provided.

A lid according to the invention has not only the advantage that it is simultaneously adapted for covering and for serving the kitchen utensil, but a further disadvantage of the utensil lids as used up to now is eliminated, i.e. the difficulty of storing them. Lids of the kind used up to now are bulky and, as is generally known, can be stored in the kitchen only with difficulty. Special lid racks are often used for their storage. Generally these lid racks hold only a small number of lids of limited size and furthermore they demand special space for suspension or for their setting up. Lids configurated according to the invention, the handle of which can be taken off and which have the form of a bowl or a plate after the handle is removed, can be stacked in each other to any number just as is usual with bowls and plates, and they can be stored anywhere, e.g. in the kitchen cabinet.

Other objects and advantages will be apparent from a consideration of the specification and claims.

Fig. 1 is a cross-sectional elevation of the lid forming part of the utensil;
Fig. 2 is a perspective view of a handle of the utensil;
Fig. 3 is a cross-section of the utensil in use;
Fig. 4 is a plan view of a handle used with the utensil;
Fig. 5 is an elevational cross-section of a convex lid form for the utensil;
Fig. 6 is an elevational cross-section of a concave lid form for the utensil;
Fig. 7 is an elevational cross-section of another form of lid for the utensil;
Fig. 8 is an elevational cross-section of the lid of Fig. 7 as used with the utensil; and
Fig. 9 shows a number of lids stacked together.

Figure 1 shows a convex lid 1 with a flat bearing rim 2, which is provided in its middle with a laterally bulged recess 3 for inserting a handle 4.

In the case of this embodiment, the handle 4 is formed of spring wire and is shown separately in Fig. 2. It consists of a hoop 4a and an elastic bottom part 4b, with which it snaps into the lateral bulge, when pressed into the recess 3. Instead of a hoop handle formed from spring wire, a handle of a different configuration can, of course, be used. It is merely essential, that the handle has a bottom part respectively a handle holder, by means of which it can be fastened to the lid and which can be removed without difficulty.

Figure 3 shows the lid 1, as illustrated in Figure 1, as a serving stand. The lid reposes, in the case of Figure 3, with its top side placed downward on a bearing surface 5; in the open bowl which is thus formed the appertaining kitchen utensil, in this case a kitchen pot 6, is inserted. The bottom rim of the pot 6 reposes, in the illustration as shown in Fig. 3, on the wall of the bowl and its bottom surface rests on the recess 3, which is now directed upward. Thus a heat insulating hollow space 7 is formed, which prevents an undesirable intensive heating of the lid, now forming the service stand.

In order to emphasize the character of the kitchen utensil according to the invention as a serving utensil to a greater extent, it is recommended to configurate the handles of the kitchen utensil likewise in such a way, that they are removable. For this purpose the kitchen utensil is provided, in the case of Figure 3, with a groove 8 surrounding it and directed towards the interior and with an annular hoop 9 of spring wire which serves as a handle, this wire being bent on two diametrically opposed places to form handles 10. Reference is made in this respect also to Figure 4. Such a handle is placed around the bottom of the kitchen utensil and pushed upward until it reaches and snaps into the groove 8. By pressing downward the handle can be removed again easily. This arrangement has the advantage that the kitchen utensil can be served without any handles and does not look like a kitchen pot on the table.

Instead of a laterally bulged recess 3, a button-like elevation 11, which is arranged in a recess, can also be provided for holding the lid handle as is illustrated in Figure 5 with the embodiment of a convex lid and a smooth rim directed downward. The bottom part of the handle 4 is, in this case, formed so that it grips the button-shaped elevation 11 elastically.

Fig. 6 shows a concave lid with a supporting rim 12 bent upward. In order to fix the handle 4 there is a knob-like elevation 13 arranged in the middle of the curvature. The handle 4 has the same configuration as the handle shown in Fig. 5. A lid thus executed can be placed when serving with its under side on the bearing surface, contrary to the executions of Figures 1 and 5.

A similar execution of the lid is shown in Figure 7.

The difference to Figure 6 consists, in this execution, in the fact that the middle part 14 of the lid is slightly convex and that in the middle of the curvature a laterally bulged recess 15 is provided, in which a handle 4 of the configuration shown in Fig. 1 can be fixed.

Figure 8 again shows the use of a kitchen utensil 6 according to the invention as a serving utensil. As a serving stand a lid 16 of the configuration shown in Figure 7 is used. When such a lid is used as a serving stand, two insulating spaces are formed between the kitchen utensil and the lid, one of which is represented by the recess 15, while the other consists of the remaining bowl space 17. If the curvature 14 is sufficiently high or if the diameter of the bowl is sufficiently great, the kitchen utensil reposes only on the upper rim of the recess 15, as is evident from Figure 8. In this case the insulating room 17 is open at its periphery, so that continuously fresh air can penetrate into this space, whereby its heat-protecting effect is considerably increased. The same effect can also be obtained by a convenient configuration of the other features of the lid, e.g. by a sufficient dimensioning of the recess 3 (Figures 1 and 3) or of the button-like elevation 13 (Figure 6).

The advantages of a kitchen utensil according to the invention consists not only in the fact that it may be used for cooking as well as for serving, but it has the supplementary advantage that the lids of the configuration according to the invention can be readily and easily stored. They can, as illustrated in Figure 9, be stacked on top of each other to any number, just as bowls or plates and can be stored in the kitchen cabinet or in any other place.

I claim:

1. A lid for kitchen utensils comprising a convex plate element having a central recessed portion for securing a removable lid handle, said lid formed with a flat bearing surface adjacent said recessed portion for placing the lid on a suitable support and a spring wire handle detachably secured in said recessed portion, said recessed portion being formed with a lateral bulge for engaging said spring wire handle.

2. A lid for kitchen utensils comprising a convex plate element having a central recessed portion for securing a removable lid handle, said lid formed with a flat bearing surface adjacent said recessed portion for placing the lid on a suitable support and a spring wire handle detachably secured in said recessed portion, said recessed portion being provided with a button-shaped extension projecting below the flat bearing surface, for clamping said spring wire handle.

References Cited in the file of this patent

UNITED STATES PATENTS

| | | |
|---|---|---|
| 238,505 | Hore | Mar. 8, 1881 |
| 241,756 | Timberlake | May 17, 1881 |
| 310,716 | Palmer | Jan. 13, 1885 |
| 377,632 | Melloy | Feb. 7, 1888 |
| 476,137 | Eustis | May 31, 1892 |
| 819,441 | Lasher | May 1, 1906 |
| 1,950,378 | Andrews | Mar. 13, 1934 |
| 2,648,460 | Tatter | Aug. 11, 1953 |

FOREIGN PATENTS

| | | |
|---|---|---|
| 332,498 | France | May 9, 1903 |